United States Patent
Mori et al.

(10) Patent No.: US 10,846,773 B2
(45) Date of Patent: Nov. 24, 2020

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventors: Maki Mori, Tokyo (JP); Nobuo Onodera, Tokyo (JP)

(73) Assignee: Rakuten, Inc., Tokyo (JP)

( * ) Notice: Subject to any disclaimer, the term of this patent is extended or adjusted under 35 U.S.C. 154(b) by 410 days.

(21) Appl. No.: 15/527,413

(22) PCT Filed: Dec. 25, 2014

(86) PCT No.: PCT/JP2014/084255
§ 371 (c)(1),
(2) Date: May 17, 2017

(87) PCT Pub. No.: WO2016/103383
PCT Pub. Date: Jun. 30, 2016

(65) Prior Publication Data
US 2017/0330260 A1    Nov. 16, 2017

(51) Int. Cl.
*G06Q 30/00* (2012.01)
*G06Q 30/06* (2012.01)
*G06F 16/951* (2019.01)

(52) U.S. Cl.
CPC ....... *G06Q 30/0625* (2013.01); *G06F 16/951* (2019.01)

(58) Field of Classification Search
CPC .......................... G06Q 30/0625; G06F 16/951
(Continued)

(56) References Cited

U.S. PATENT DOCUMENTS

2009/0299998 A1* 12/2009 Kim .................... G06F 16/951
2015/0154683 A1    6/2015 Nishioka

FOREIGN PATENT DOCUMENTS

JP    2014-086041 A    5/2014
TW      201209744 A    3/2012

OTHER PUBLICATIONS

Abhinaya, G. "Equipped search results using machine learning from web databases". International Conference on Information Communication and Embedded Systems (ICICES2014) (pp. 1-6). Computer Science and Engineering Jerusalem College of Engineering Chennai, India. Feb. 1, 2014 (Year: 2014).*

(Continued)

*Primary Examiner* — Anand R Loharikar
(74) *Attorney, Agent, or Firm* — Sughrue Mion, PLLC

(57) ABSTRACT

An information processing device includes a process target item extraction unit that refers to a database that stores keyword sets, each of the keyword sets being selected preliminarily as a combination of a plurality of search keywords unlikely to be simultaneously assigned to an identical item, performs item search on a database that stores item information using each of the search keyword belonging to one of the keyword sets, and extracts a process target item an appropriateness determination unit that determine for the extracted process target item, the determination determining a search keyword that should not be assigned to the process target item as an inappropriate keyword, among respective search keywords of the keyword set used for the extraction of the process target item and an inappropriate keyword handling process unit performs an inappropriate keyword handling process to improve a search result of item search.

9 Claims, 17 Drawing Sheets

(58) Field of Classification Search
USPC .............................................. 705/26.1–27.2
See application file for complete search history.

(56) References Cited

OTHER PUBLICATIONS

International Search Report of PCT/JP2014/084255 dated Jan. 27, 2015.

* cited by examiner

FIG. 4

USER DB 100A

| USER ID | LOGIN PW | NAME | ADDRESS | CONTACT | · · · |
|---------|----------|------|---------|---------|-------|
| U0001 | ⋮ | ⋮ | ⋮ | ⋮ | ⋮ |
| ⋮ | | | | | |

FIG. 5

ITEM PROVIDER DB 100B

| ITEM PROVIDER ID | LOGIN PW | STORE NAME | STORE LOGO MARK | DEALING ITEM ID | ITEM PAGE URL | PRICE | ITEM PROVIDER PAGE URL | CONTACT |
|---|---|---|---|---|---|---|---|---|
| M0001 | **** | AA MARKET | http://zzz.... | I0001<br>I0231<br>I4902<br>... | http://xxx.0001....<br>http://xxx.0231....<br>http://xxx.4902....<br>... | 980<br>3850<br>98000<br>... | http://yyy.0001.... | ... |
| M0002<br>... | ... | ... | ... | ... | ... | ... | ... | ... |

FIG. 6

ITEM DB 100C

| ITEM ID | ITEM CATEGORY | ITEM IMAGE | MANUFACTURER INFORMATION | SERIAL NUMBER INFORMATION | RELEASE DATE | DEALING ITEM PROVIDER |
|---|---|---|---|---|---|---|
| I0001 | FOOD | http://abc.01···<br>http://abc.02··· | M_ID_0001 | K_0001 | 2014/10/5 | M0001<br>M0025<br>M1529<br>··· |
| I0002<br>··· | ··· | ··· | ··· | ··· | | ··· |

FIG. 8

SEARCH DB 100E

| SEARCH KEYWORD | ITEM PAGE ID | PRIORITY | APPROPRIATENESS FLAG |
|---|---|---|---|
| ○△× | IP0001<br>IP0127<br>IP0293<br>⋮ | 100<br>95<br>61<br>⋮ | APPROPRIATE<br>APPROPRIATE<br>INAPPROPRIATE<br>⋮ |
| □□△<br>⋮ | ⋮ | ⋮ | ⋮ |

FIG. 9

KEYWORD DB 200A

| KEYWORD SET ID | SEARCH KEYWORD | EXCEPTION INFORMATION |
|---|---|---|
| KS0001 | BRAND A, BRAND B, BRAND C, BRAND D | I0001 |
| KS0002 | BRAND E, BRAND F, BRAND G | BRAND E, BRAND G |
| ... | ... | ... |
| KS0154 | AUTHOR A, AUTHOR B | I0381 |
| ... | ... | ... |
| KS0267 | SINGER A, SINGER B | I2129 |
| ... | ... | ... |

INFORMATION PROCESSING DEVICE, INFORMATION PROCESSING METHOD, PROGRAM, AND STORAGE MEDIUM

CROSS REFERENCE TO RELATED APPLICATIONS

This is a National Stage of International Application No. PCT/JP2014/084255 filed Dec. 25, 2014, the contents of which are incorporated herein by reference in its entirety.

TECHNICAL FIELD

The present invention relates to an information processing device, an information processing method, a program, and a storage medium. In particular, the invention relates to improvement of a search result in item search.

CITATION LIST

Patent Literature

Patent Literature 1: JP2014-086041 A

BACKGROUND ART

When searching for an item in electronic commerce, for example, input of a keyword or a similar term related to the item into an input column for search, which is provided on a web page or the like, is widely conducted. By such operation, a user can obtain information about the item the user desires.

For example, Patent Literature 1 discloses a web page where an input column for search (search input unit) is provided.

SUMMARY OF INVENTION

Technical Problem

An item extracted by such item search can gain an opportunity to attract a user's attention, resulting in a higher possibility of transaction. Therefore, an item provider contemplates how to associate an item that the item provider sells with a keyword a user uses for search. As a consequence, an item provider may associate an item that the item provider sells with a keyword or similar term inherently inappropriate for association, so that the item is more likely to be extracted as a search result of a user. Such item tends to be an item that should not be extracted based on the keyword used for the item search. By extraction of an inappropriate item as a search result, a user may feel the accuracy and quality of item search degraded. As a result, a user may refrain from using the electronic commerce.

In view of the above situation, an object of the present invention is to improve the accuracy and quality of item search.

Solution to Problem

An information processing device according to the present invention includes a process target item extraction unit, an appropriateness determination unit, and an inappropriate keyword handling process unit. The process target item extraction unit refers to a database that stores keyword sets, each of the keyword sets being selected preliminarily as a combination of a plurality of search keywords unlikely to be jointly assigned to an identical item, performs item search on a database that stores item information, using each of the search keywords belonging to one of the keyword sets, and performs an extraction of a process target item. The appropriateness determination unit performs a determination for the extracted process target item, the determination determining a search keyword that should not be assigned to the process target item as an inappropriate keyword, among respective search keywords of the keyword set used for the extraction of the process target item. The inappropriate keyword handling process unit performs an inappropriate keyword handling process that improves a search result of item search using the search keyword determined as the inappropriate keyword.

Thus, an appropriate search result is extracted as a result of item search using the inappropriate keyword.

In the information processing device described above, the appropriateness determination unit preferably performs the determination using category information to which the process target item belongs.

Thus, the determination is performed, reflecting tendency of search keyword assignment in the item category to which the item belongs.

In the information processing device described above, the appropriateness determination unit preferably performs the determination using the number of appearances of the inappropriate keyword in an item page describing item information of the process target item Thus, a keyword appearing equal to or more than a predetermined number of times is determined as a necessary keyword for the item page and is not determined as an inappropriate search keyword.

In the information processing device described above, the process target item extraction unit preferably performs the extraction referring to a database that stores information of an item to be excluded from the process target item.

Thus, a condition of each item is reflected, and an item to be excluded from a process target item is prevented from being extracted as a process target item.

In the information processing device described above, the inappropriate keyword handling process unit preferably performs an improvement process for description of the inappropriate keyword concerning an item page of the process target item, on a database that stores information of an item page, as the inappropriate keyword handling process.

Thus, a database that stores information of an item page information is improved.

In the information processing device described above, the inappropriate keyword handling process unit preferably performs a process of lowering display priority of the process target item in the search result of item search, as the inappropriate keyword handling process.

Thus, display of the process target item in the search result of item search is improved.

In the information processing device described above, the inappropriate keyword handling process unit preferably performs a non-display process to exclude the process target item from display of the search result of item search as the inappropriate keyword handling process.

Thus, the process target item is not displayed in the search result of item search.

An information processing method according to the present invention is an information processing method performed by an information processing device. The method includes the following steps: a step of referring to a database that stores keyword sets, each of the keyword sets being selected preliminarily as a combination of a plurality of search keywords unlikely to be jointly assigned to an identical item, and of performing item search targeting a database that stores item information using each of the search keywords belonging to one of the keyword sets; a step of performing an extraction of a process target item, of performing a determination for the extracted process target item, the determination determining a search keyword that should not be assigned to the process target item as an inappropriate keyword, among respective search keywords of the keyword set used for the extraction of the process target item; and a step of performing an inappropriate keyword handling process that improves a search result of item search using the search keyword determined as the inappropriate keyword.

With the information processing method, processing is performed so that the search result of item search is improved.

A program according to the present invention is a program for causing an information processing device to perform a process that is performed as the above information processing method.

A storage medium according to the present invention is a storage medium storing the above program. These program and storage medium achieve the above information processing device.

Advantageous Effects of Invention

According to the present invention, the accuracy and quality of item search is improved.

BRIEF DESCRIPTION OF DRAWINGS

FIG. 4 is a diagram illustrating an example of a user DB according to the embodiment.
FIG. 5 is a diagram illustrating an example of an item provider DB according to the embodiment.
FIG. 6 is a diagram illustrating an example of an item DB according to the embodiment.
FIG. 8 is a diagram illustrating an example of a search DB according to the embodiment.
FIG. 9 is a diagram illustrating an example of a keyword DB according to the embodiment.

DESCRIPTION OF EMBODIMENTS

This embodiment illustrates an electronic commerce server and an item monitoring server as an example. The electronic commerce server provides an electronic commerce service. The item monitoring server determines appropriateness of a keyword or a similar term associated with an item.
The following describes the embodiment in the order listed below.
<1. General Configuration>
<2. Hardware Configuration>
<3. Databases>
<4. Process Flow>
<5. Examples of Appropriateness Determination Process>
[5-1. First Example of Appropriateness Determination Process]
[5-2. Second Example of Appropriateness Determination Process]
[5-3. Third Example of Appropriateness Determination Process]
<6. Examples of Inappropriate Keyword Handling Process>
[6-1. First Example of Inappropriate Keyword Handling Process]
[6-2. Second Example of Inappropriate Keyword Handling Process]
[6-3. Third Example of Inappropriate Keyword Handling Process]
[6-4. Fourth Example of Inappropriate Keyword Handling Process]
<7. Modifications>
<8. Summary>
<9. Program and Storage Medium>

1. General Configuration

Figure 1:
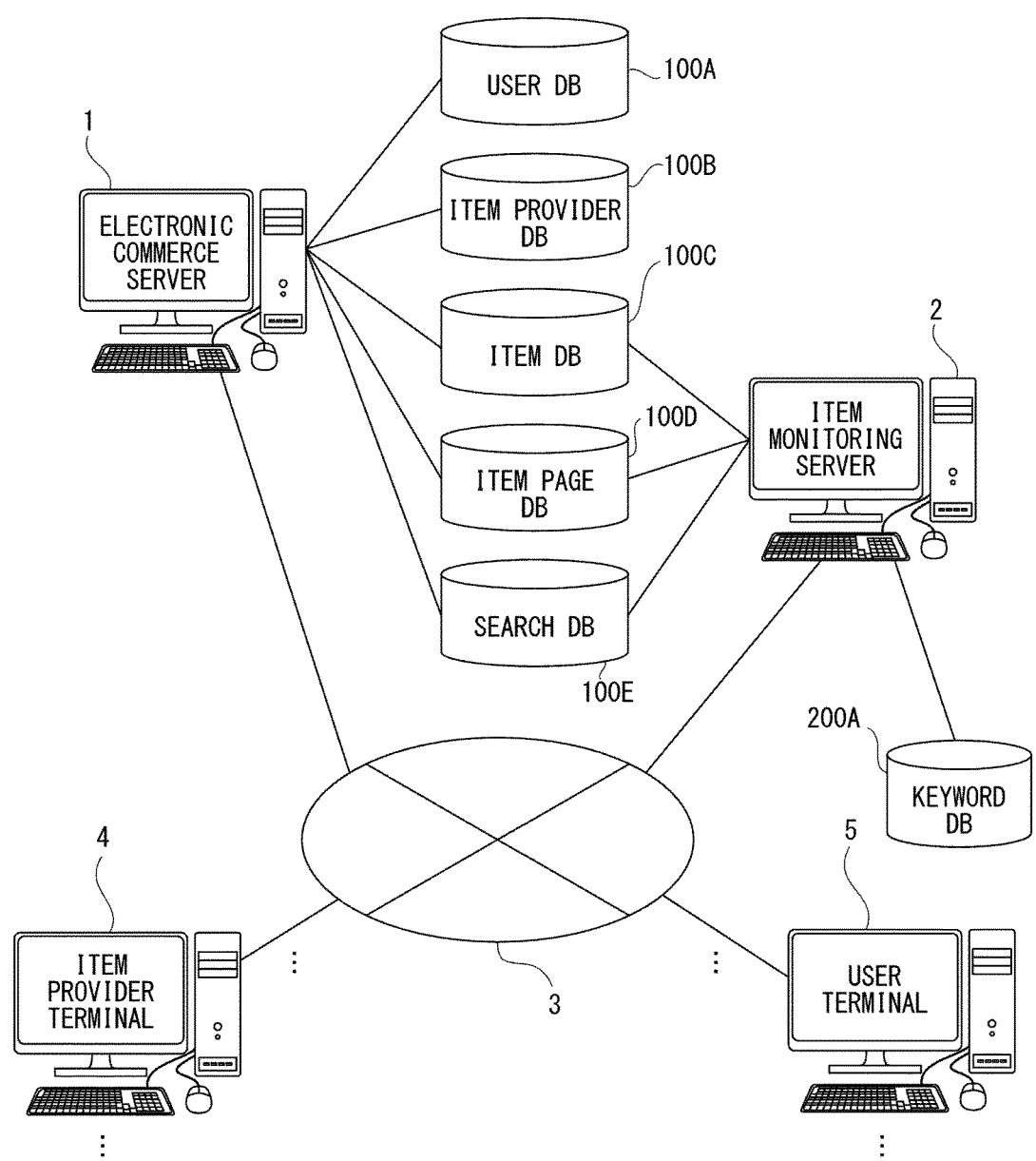
FIG. 1 is a diagram showing an overall configuration according to an embodiment of the present invention.

A general configuration of a network system including an electronic commerce server 1 and an item monitoring server 2 according to this embodiment is now described with reference to FIGS. 1 and 2.
As shown in FIG. 1, the electronic commerce server 1 according to the embodiment is connected to the item monitoring server 2, an item provider terminal 4 and a user terminal 5 over a communication network 3 so that they can communicate with each other.
The electronic commerce server 1 is an information processing device that provides a variety of services related to commercial transactions. The variety of services include, for example, an item search service, an item management function, a user information management service, an item provider information management service, and a payment process service, and the like. The item search service searches for an item desired by a user among a group of items dealt in the electric commerce and presents the item. The item management function manages an item an item provider desires to sell. The user information management service manages user information and presents the information as needed. The item provider information management service manages item provider information and presents the information as needed. The payment process service mediates in payment when a transaction of an item is made.

In addition, the electronic commerce server 1 manages keywords used for a search (search keywords) and items that are dealt in, directly or indirectly in association with each other, in order to provide the item search service. In a case of management involving direct association, the electronic commerce server 1 manages the search keywords and the items, for example, by associating an item with each search keyword. In a case of management involving indirect association, the electronic commerce server 1 manages the search keywords and the items, for example, by associating a web page including item information (hereinafter, referred to as an item page) with an item. Accordingly, the information included in an item page is indirectly managed as a search keyword.

The electronic commerce server 1 manages a variety of Databases (DBs) so as to provide the above various services. For example, the electronic commerce server 1 manages a user DB 100A, an item provider DB 100B, an item DB 100C, an item page DB 100D, a search DB 100E, and a similar DB: The user DB 100A stores user information. The item provider DB 100B stores item provider information. The item DB 100C stores item information. The item page DB 100D stores item page information. The search DB 100E is used for item search. The details of each DB will be described later.

The item monitoring server 2 determines whether or not a search keyword managed in association with each item by the electronic commerce server 1 is appropriate. When determining that a search keyword is inappropriate, the item monitoring server 2 performs a variety of processes that will be described later. For this purpose, the item monitoring server 2 manages a keyword DB 200A. The keyword DB 200A stores a set of a plurality of search keywords that are unlikely to be associated jointly with an identical item (hereinafter, referred to as a keyword set). The details of the keyword DB 200A will be described later.

Figure 2:
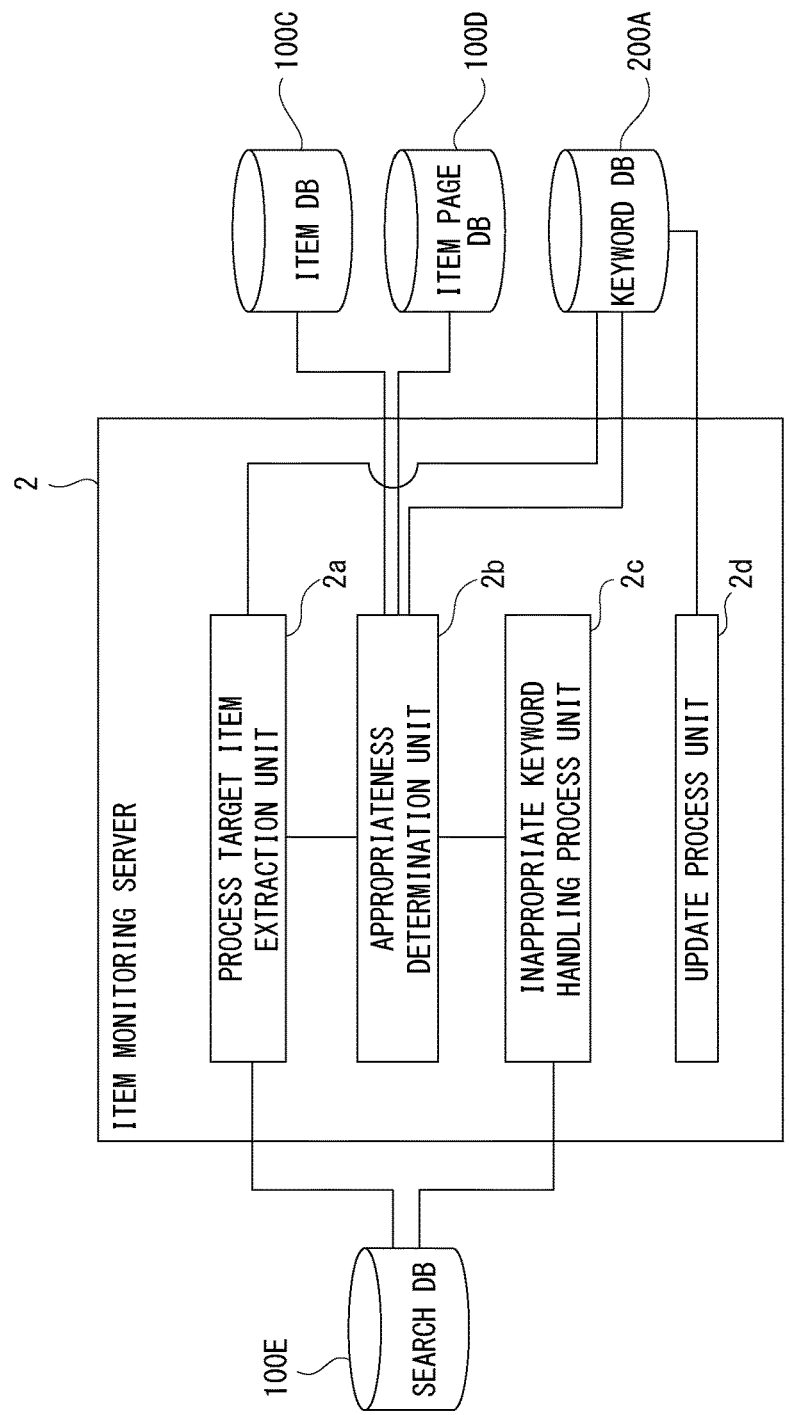
FIG. 2 is a block diagram of an item monitoring server according to the embodiment.

The item monitoring server 2 includes a process target item extraction unit 2a, an appropriateness determination unit 2b, an inappropriate keyword handling process unit 2c, and an update process unit 2d as shown in FIG. 2.

The process target item extraction unit 2a searches for information stored in the search DB 100E, by using a keyword set stored in the keyword DB 200A, and extracts a process target item, which may be associated with an inappropriate search keyword. At the process, the process target item extraction unit 2a uses exception item information and the like stored in the keyword DB 200A.

The appropriateness determination unit 2b performs a determination whether or not a search keyword associated with the extracted process target item is an inappropriate keyword. At the process, the appropriateness determination unit 2b performs a determination using item information stored in the item DB 100C, store information stored in the item page DB 100D, and the like.

The inappropriate keyword handling process unit 2c performs an inappropriate keyword handling process so that a search result of item search becomes appropriate, with the item search using a search keyword determined as an inappropriate keyword. For more details, some process examples will be described later.

The update process unit 2d performs an update process. The update process includes update of a keyword set and update of exception item information, which is stored in the keyword DB 200A.

The configuration of the communication network 3 in FIG. 1 is not particularly limited. Examples of the communication network 3 can include the Internet, an intranet, an extranet, a local area network (LAN), a community antenna television (CATV) network, a virtual private network, a telephone network, a mobile communication network, a satellite communication network, and a similar network.

There can also be various examples of a transmission medium constituting all or part of the communication network 3. The examples can include not only wires such as an Institute of Electrical and Electronics Engineers (IEEE) 1394, a universal serial bus (USB), a power-line communication, and a telephone line; but also wireless such as infrared light like infrared data association (IrDA), Bluetooth (registered trademark), 802.11 wireless, a mobile telephone network, a satellite channel, and a digital terrestrial network.

The item provider terminal 4 illustrated in FIG. 1 is a terminal utilized by an item provider, who sells his or her item via the services provided by the electronic commerce server 1.

The item provider terminal 4 performs a variety of sending and receiving processes and similar processes as needed.

The user terminal 5 is an information processing device that is used by a user who receives the above various services. Examples of the user terminal 5 include a personal computer (PC) with communication capabilities, a feature phone, a personal digital assistant (PDA), a smart device such as a smartphone or a tablet device, or a similar device.

2. Hardware Configuration

Figure 3:
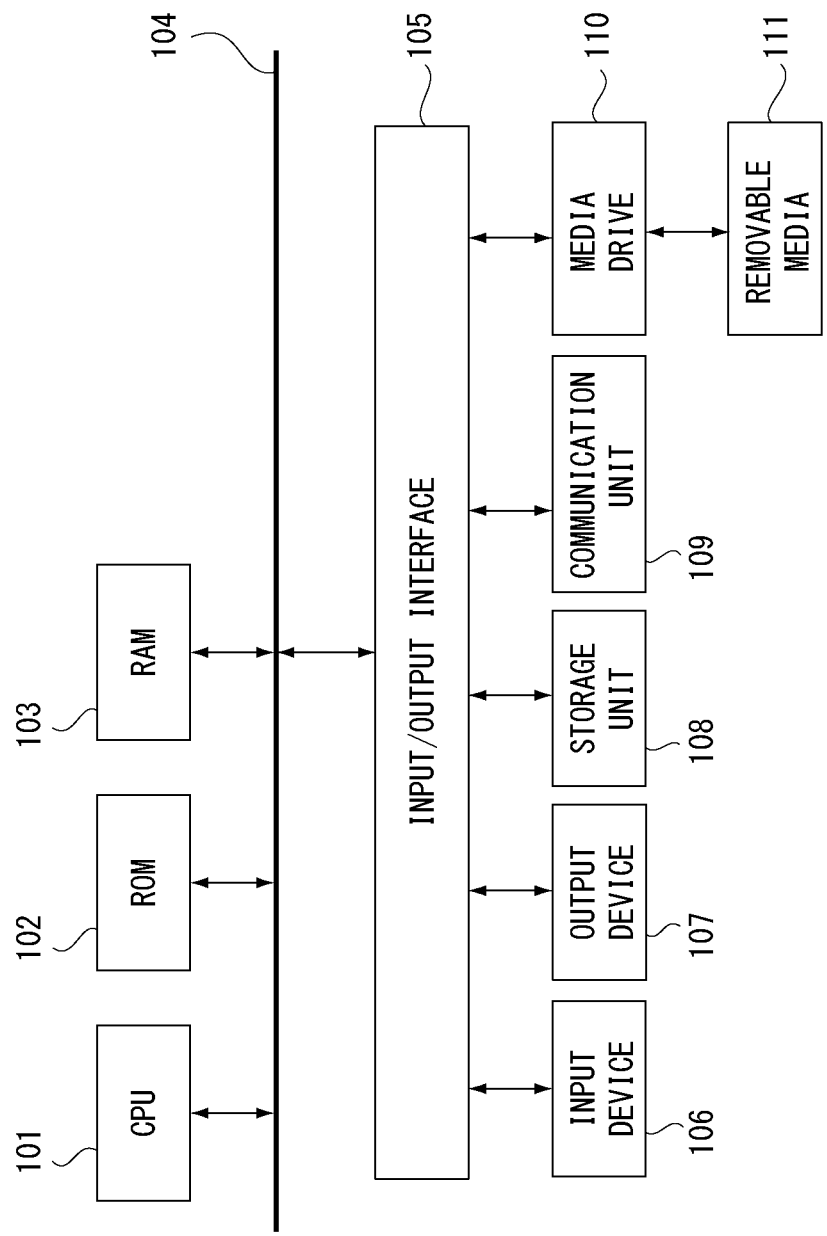
FIG. 3 is a block diagram of a computer device according to the embodiment.

FIG. 3 is a diagram illustrating an example of hardware of the electronic commerce server 1, the item monitoring server 2, the item provider terminal 4, and the user terminal 5, which are shown in FIG. 1. A central processing unit (CPU) 101 of a computer device in each of the servers and each of the terminals performs various processing in accordance with programs stored in a read only memory (ROM) 102 or programs loaded from a storage unit 108 to a random access memory (RAM) 103. The RAM 103 also stores data required for the CPU 101 to perform the various processing and other data as appropriate.

The CPU 101, the ROM 102, and the RAM 103 are connected to each other via a bus 104. An input/output interface 105 is also connected to this bus 104.

An input device 106, an output device 107, the storage unit 108, and a communication unit 109 are connected to the input/output interface 105. The input device 106 includes, for example, a keyboard, a mouse, and a touch screen. The output device 107 includes, for example, a display, such as a liquid crystal display (LCD), a cathode ray tube (CRT), or an organic electroluminescent (EL) panel, and a speaker. The storage unit 108 includes, for example, a hard disk drive (HDD) and a flash memory device. The communication unit 109 performs communication processing and inter-device communications over the communication network 3.

A media drive 110 is also connected to the input/output interface 105 as needed. A removable medium 111, such as a magnetic disk, an optical disk, a magneto-optical disk, or a semiconductor memory, is mounted on the media drive 110 as appropriate, and then information is written to and read from the removable medium 111.

Such a computer device can upload and download data and programs through communications with the communication unit 109, and can exchange data and programs via the removable medium 111.

The CPU 101 performs processing operations in accordance with various programs to cause each of the various information processing devices such as the electronic commerce server 1, the item monitoring server 2, the item provider terminals 4, and the user terminals 5 to perform information processing and communications, which are described below.

Each information processing device constituting of the electronic commerce server 1, the item monitoring server 2, the item provider terminal 4, and the user terminal 5, is not limited to a single computer device as illustrated in FIG. 3, and may include a plurality of computer devices integrated into a system. The plurality of computer devices may be integrated into a system, for example, via a LAN, or may be located remote from each other, for example, over a virtual private network (VPN) using the Internet.

3. Databases

The user DB 100A stores information of each user who receives a service provided by the electronic commerce server 1.

Specifically, as shown in FIG. 4, user identification (ID), a login password (PW), and a user's name, address, and contact (a telephone number and an email address) may be stored as user information. Further, a purchase history and a viewing history of each user may be stored.

The user DB 100A need not store all of the above described information. Certain information may not be stored for some users. However, at least a user ID and a login PW are preferably stored.

The item provider DB 100B stores information of an item provider providing an item via the electronic commerce server 1.

Specifically, as shown in FIG. 5, item provider ID, a login PW, a store name, a store logo mark, an item ID of a dealing item (item unique code information assigned to each item by the electronic commerce server 1), an item page URL, a price of each product, an item provider page Uniform Resource Locator (URL), and contact (a telephone number and an email address) may be stored as item provider information. The item page URL is a URL assigned to each item page. Different item page URLs are assigned to an identical item, if provided by different item providers.

The information of the store logo mark may be image data itself, or link information (URL information) storing image data.

In addition to the item ID, availability of an item may be stored as dealing item information.

In addition to an item provider page provided by the electronic commerce server 1, a web page of an item provider (for example, a store home page (HP)) that is managed by another server, may be stored as the URL of the item provider page.

The item DB 100C stores information about each item that can be transacted via the electronic commerce server 1.

Specifically, for example, as shown in FIG. 6, an item ID, an item category, an item image, manufacturer (maker) information, serial number information assigned by a manufacturer, a release date, and information of dealing item provider are stored as item information.

The information of the item image may be image data itself, or link information (URL information) storing image data.

In addition to those, the item DB 100C may store a place of production, specifications (a color, a size, and a function) of an item, and similar information.

The item page DB 100D stores HyperText Markup Language (HTML) data of an item page corresponding to each item that can be transacted via the electronic commerce server 1.

Figure 7A:
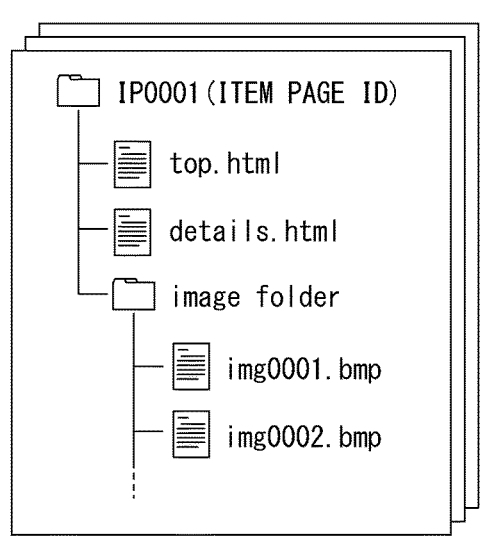
FIGS. 7 A and B each is a diagram illustrating an example of an item page DB according to the embodiment.
Figure 7B:
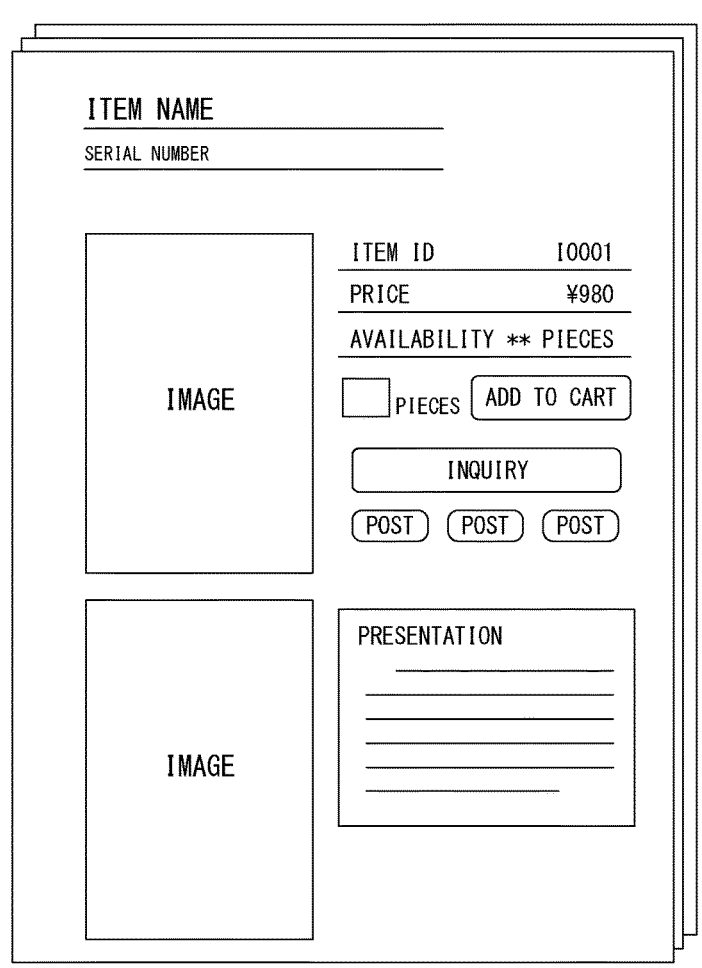

Specifically, as shown in FIG. 7A, the HTML data, image data described in the HTML data and the like are stored in association with each item page. As shown in FIG. 7B for example, in the HTML data, an item name, the serial number information, the item ID, price information, the item image, the description of an item, and similar information are stored, along with their arrangement information on a web page. Further in the HTML data, information such as one or a plurality of input columns, buttons, and the like are stored, along with their arrangement information on a web page. The input columns include a column for inputting a quantity of an item for purchase and a similar column. The buttons include a button for posting the item information to Social Networking Service (SNS).

As shown in FIG. 8, for example, the search DB 100E stores a search keyword associated with the item page ID, priority and appropriateness flag of an item page extracted by item search using the search keyword. The appropriateness flag of an item page has a binary status, "appropriate" and "inappropriate". An item page that is set to "inappropriate" is not extracted as a search result of item search using the search keyword.

Each variety of information stored in the search DB 100E is updated by periodic crawling of the item page DB 100D.

As described above, the keyword DB 200A stores, as a keyword set, a set of a plurality of search keywords that are contradictory, for example, and are unlikely to be associated jointly with an identical item.

Specifically, as shown in the FIG. 9, for example, a keyword set ID is stored in association with a plurality of search keywords and exception information.

As an example of the plurality of keywords, a keyword set whose keyword set ID is KS0001 is described. A brand A, a brand B, a brand C, and a brand D are associated with the keyword set. In other words, the brand A, the brand B, the brand C, and the brand D are selected with the estimation that they are usually inappropriate to be associated with an identical item as a search keyword. That is, these search keywords are unlikely to be jointly assigned to an identical item. In addition, the keyword set having the keyword ID KS0001 is associated with an item ID 0001 as exception information. The item ID 0001 is an item containing items from a plurality of brands to be sold. For example, such item is a lucky bag.

Further, a brand E, a brand F, and a brand G are associated with a keyword set ID KS0002. Further, the keyword set having the keyword set ID KS0002 is associated with the brand E and the brand G as exception information. The brand E and the brand G are stored as exception information, since the brand E and the brand G are, for example, affiliated and may be jointly associated with an identical item. Accordingly, in the present example, a case where the brand E and the brand F are associated with an identical item and a case where the brand F and the brand G are associated with an identical items are determined as inappropriate.

Further, another keyword set having a keyword set ID KS0154 is associated with a plurality of authors. The keyword set is associated with an item ID of a co-authored book as exception information.

Furthermore, a keyword set having a keyword ID KS0267 is associated with a plurality of singers. The keyword set is associated with an item ID (I2129) of an omnibus Compact Disc (CD) as exception information, with the CD including songs of the plurality of singers.

Besides, a keyword set may be preliminarily selected, for example, manually by personnel or automatically by a processor.

In a case of automatic selection, for example, names of brands overlapping in a product category may be configured to be selected and registered as a keyword set.

Also a keyword set may be associated with equal to two or more search keywords. For example, three or four search keywords may be associated with a keyword set.

4. Process Flow

Figure 10:
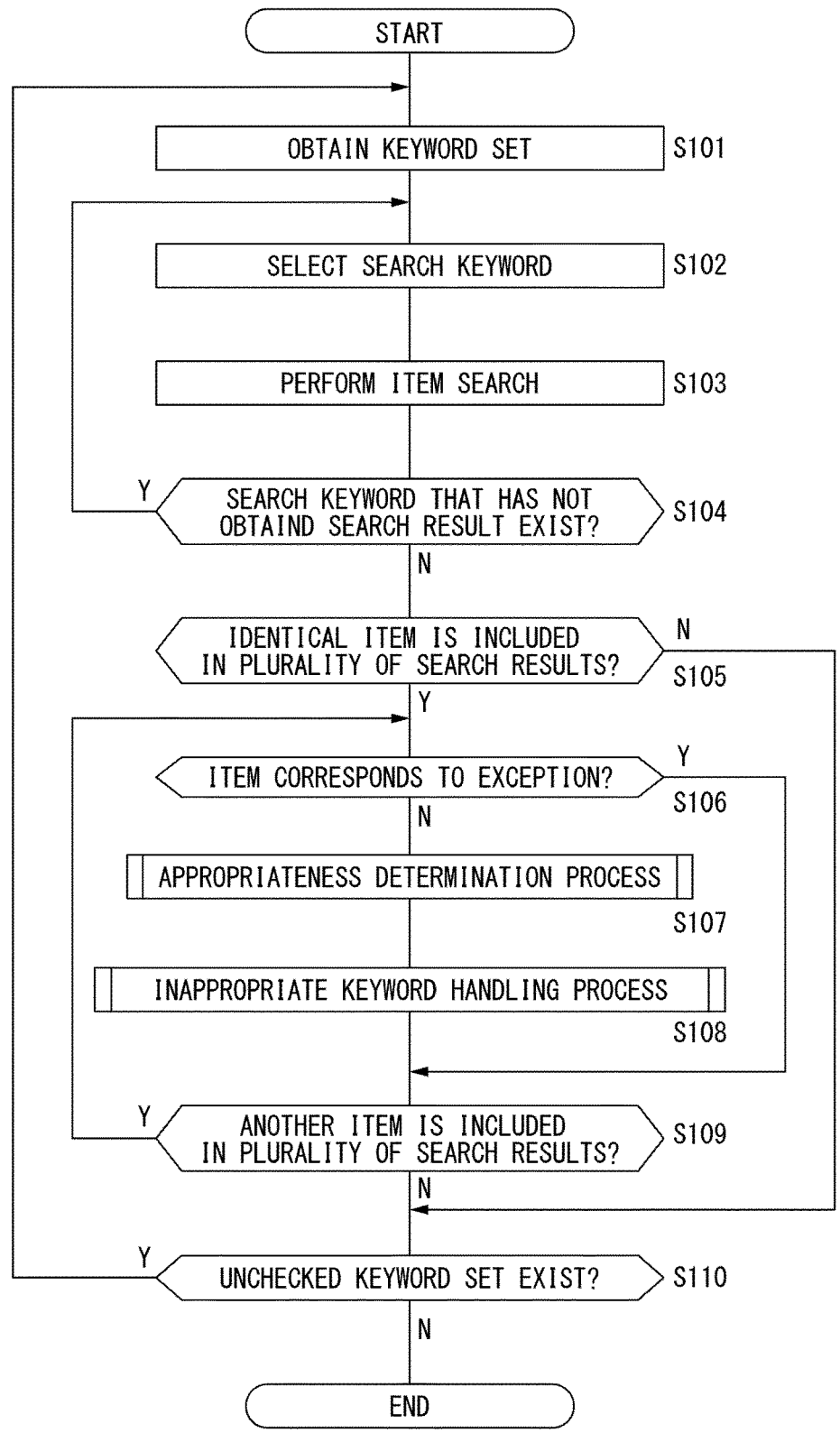
FIG. 10 is a flowchart showing a process flow.

The following describes a process flow with reference to FIG. 10. In the process flow, for each item managed by the electronic commerce server 1, the item monitoring server 2 detects and handles an inappropriate keyword.

In the following description, the process flow is illustrated specifically using "item A" that is associated with a plurality of search keywords including "brand A" and "brand C".

First, in Step S101, the process target item extraction unit 2a of the item monitoring server 2 obtains one keyword set (for example, a keyword set having a keyword ID KS0001) from the keyword DB 200a. In a case where a plurality of keyword sets exist, the process target item extraction unit 2a obtains a keyword set one by one as Step S101 is performed, so as to avoid overlapping.

Subsequently, in Step S102, the process target item extraction unit 2a selects one (for example, "brand A") from a plurality of keywords (for example, "brand A", "brand B", "brand C", and "brand D") belonging to the keyword set obtained in Step S101 (the keyword set ID KS0001).

Then, in Step S103, using the search keyword selected in Step 102, the process target item extraction unit 2a performs item search and obtains a search result. The item search is performed targeting, for example, the search DB 100E. In this case, an item page whose appropriate flag is set to "inappropriate" is not extracted as a search result.

Next, in Step S104, the process target item extraction unit 2a determines whether or not a search keyword that has not obtained any search result of the item search exists among the plurality of search keywords associated with the keyword set obtained in Step S101 (the keyword set ID KS0001). As long as a search keyword that has not obtained a search result exists, the process target item extraction unit 2a performs Steps S103 and S104 repeatedly.

When a search keyword that has not obtained a search result no longer exists, it is assumed that the process target item extraction unit 2a has obtained the search results of the item search for all of the search keywords (that is all of "brand A", "brand B", "brand C", and "brand D") associated with the keyword set obtained in Step S101 (the keyword set ID KS0001).

In this case, in following Step S105, the process target item extraction unit 2a determines whether or not an identical item is included in each search result that is based on respective search keywords obtained in Step S103. When an identical item is included, the process target item extraction unit 2a determines that the item is a process target item. Besides, the identical item refers to an item sold in an identical item page. That is, the identical item is sold by an identical item provider.

When an identical item is not included in the plurality of search results, the process target item extraction unit 2a does not perform Steps S106 to S109, which are described below, and transitions to a process in Step S110.

When an identical item is included in the plurality of search results, the item in question is associated with a plurality of search keywords that are not likely to be jointly associated with an identical item. In this case, in subsequent Step S106, the process target item extraction unit 2a determines whether or not the item in question corresponds to an exception to a process target item. Specifically, when "item A" is included in the search result of the item search using "brand A" and the search result of the item search using "brand C", the process target item extraction unit 2a determines whether or not "item A" corresponds to an exception to a process target item.

As described above, an exception to the process target item includes an item containing a plurality of items, such as a lucky bag, an item belonging to a brand that is affiliated with another brand, and a similar item. An exception to the process target item also includes an item developed in collaboration by two companies, and thus being associated with the names of both companies as search keywords, and a similar item. Further, an exception to the process target item also includes an item presented with comparative information with a different brand, and the like. Information about exceptions is stored, for example, in the keyword DB 200 A.

When the process target item extraction unit 2a determines that the item in question, that is, "item A" corresponds to an exception, the process target item extraction unit 2a subsequently performs Step S109.

When the process target item extraction unit 2a determines that "item A" does not correspond to an exception, the appropriateness determination unit 2b, in Step S107, performs an appropriateness determination process for the search keywords associated with "item A", which is determined as a process target item in Step S106. As the appropriateness determination process, the appropriateness determination unit 2b determines whether or not each search keyword, which is used in the item search in Step S103 among the respective search keywords associated with the process target item, is appropriate as a search keyword of the item in question. Specifically, when "item A" is associated with the search keywords such as "brand A", "brand C", "made in Japan", and "made of wood", each of the search keywords, the appropriateness determination unit 2b determines whether or not each of "brand A" and "brand C", used in the item search performed in Step S103, is appropriate as a search keyword of "item A". Specific process of the appropriateness determination process will be described later with some examples.

Subsequently, the inappropriate keyword handling process unit 2c performs the inappropriate keyword handling process in Step S108. The inappropriate keyword handling process makes a process target item less likely to be extracted as a search result. Specifically, a process to make "item A" less likely to be extracted as a search result, is performed. Some examples of the inappropriate keyword handling process will be described later.

Subsequently, in Step S109, the item monitoring server 2 determines whether another identical item exists such that the item is included in the plurality of search results for which the determination is made in Step S105. Specifically, the item monitoring server 2 determines whether an item other than "item A" is included in the plurality of search results. As long as another identical item exists, the item monitoring server 2 performs Steps S106 to S109 repeatedly.

When another identical item does not exist, in subsequent Step S110, the item monitoring server 2 determines whether or not an unchecked keyword set exists. The unchecked keyword set is a keyword set for which the set of processes of Steps S102 to S109 has not been performed.

When an unchecked keyword set exists, the item monitoring server 2 performs the process of Step 101 again. When an unchecked keyword set does not exist, the item monitoring server 2 terminates the set of processes shown in FIG. 10.

5. Examples of Appropriateness Determination Process

[5-1. First Example of Appropriateness Determination Process]

Here, the examples of the appropriateness determination process illustrated in Step S107 of FIG. 10 are described.

A first example of the appropriateness determination process determines appropriateness based on the number of appearances of a search keyword in an item page. Specifically, the process is described with reference to FIG. 11.

First, in Step S201, the appropriateness determination unit 2b obtains, from the item DB 100D, the HTML file describing an item page structure of "brand A" as a process target item. Further, the appropriateness determination unit 2b counts the number of appearances of "brand A" in the HTML file.

Next, in Step S202, the appropriateness determination unit 2b determines whether or not the number of appearances is less than a threshold value. When the number of appearances is less than the threshold value, the appropriateness determination unit 2b, in subsequent Step S203, determines that "brand A" is an inappropriate keyword that should not be associated with "item A".

On the other hand, when the number of appearances is equal to or more than the threshold value, the appropriateness determination unit 2b determines that "brand A" is an appropriate keyword that may be associated with "item A" in Step S204.

Further, the determination may be based on the number of display appearances in an item page, instead of the number of appearances in HTML file. In this case, the term "brand A" is not counted, when the term "brand A" is described in the HTML file even though the term "brand A" is not displayed in an item page, where the purpose of description is to have the item in question extracted as a search result of item search using "brand A" as a search keyword. Accordingly the number of counts is made smaller and the search keyword "brand A" is more likely to be determined as an inappropriate search keyword.

[5-2. Second Example of Appropriateness Determination Process]

In a second example of appropriate determination process, the threshold value that is described in the first example of appropriate determination process is adjusted according to an item category. The second example is described specifically with reference to FIG. 12.

First, in Step S301, the appropriateness determination unit 2b obtains item category information of "item A" as a process target item.

Next, in Step S302, the appropriateness determination unit 2b determines whether or not the item category corresponds to a specific category. This determination is based on information stored in, for example, the keyword DB 200A. When determining that the item category corresponds to the specific category, the appropriateness determination unit 2b lowers the threshold value in following Step S303. The appropriateness determination unit 2b performs a process of lowering the threshold value (the threshold value shown in the first example of appropriate determination process) of the number of appearances (the number of appearances in HTML file or an item page) of a maker name associated with "item A" that belongs to the specific category.

Figure 12:
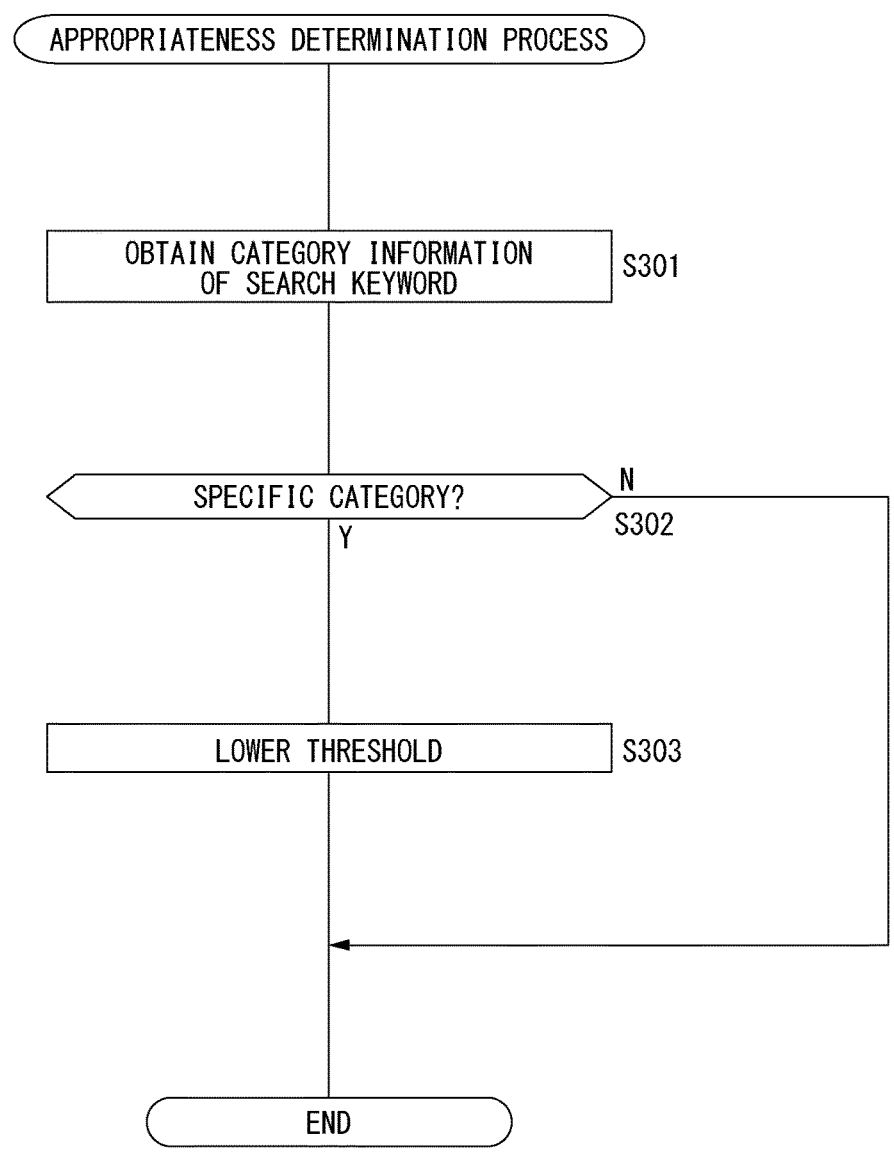
FIG. 12 is a flowchart showing second example of the appropriateness determination process.

On the other hand, when determining that the item category does not correspond to the specific category, the appropriateness determination unit 2b terminates the set of processes shown in FIG. 12.

For example, when the category information of "item A" is "desktop personal computer", it is estimated that components from a variety of makers are included in "item A".

As the threshold value is lowered, the number of appearances of each maker name becomes more likely to exceed the threshold value. That is, the appropriateness determination unit 2b is less likely to determine that the maker name is an inappropriate search keyword.

[5-3. Third Example of Appropriateness Determination Process]

In a third example of the appropriateness determination process, appropriate determination is performed according to an appearance mode of a search keyword in an item page. Specifically, the third example is described with reference to FIG. 13.

First, in Step S401, the appropriateness determination unit 2b obtains the appearance mode of a search keyword. The appropriateness determination unit 2b obtains, for example, the appearance mode whether the search keyword appears in a text or appears in a list of search keywords.

Next, in Step S402, the appropriateness determination unit 2b determines whether or not the obtained result of Step S401 is a list of words (search keywords). When the obtained result is a list of words, the appropriateness determination unit 2b determines that the search keyword in question is an inappropriate keyword in Step S403.

On the other hand, when the obtained result is not a list of words, the appropriateness determination unit 2b determines that the search keyword in question is an appropriate keyword in Step S404.

Accordingly, the appropriateness determination unit 2b determines, for example, that a term "XX" found in a text "A lower price is realized with an identical quality to XX" is not an inappropriate search keyword. However, the appropriateness determination unit 2b determines a description, such as "XX, YY, and ZZ", that search keywords such as "XX", "YY", and "ZZ" are just listed so that the items is easily extracted as a search result, is an inappropriate search keyword.

6. Examples of Inappropriate Keyword Handling Process

[6-1. First Example of Inappropriate Keyword Handling Process]

Here, the examples of the inappropriate keyword handling process illustrated in Step S108 of FIG. 10 are described.

In a first example of the inappropriate keyword handling process, the inappropriate keyword handling process unit 2c performs a process of revising information so that a process target item is not extracted as a search result of the item search using an inappropriate keyword, while preserving association between the item page of the process target item, whose search keyword has been determined as an inappropriate keyword, and the inappropriate keyword in the search DB 100E. Specifically, in the search DB 100E shown in FIG. 8, the inappropriate keyword handling process unit 2c sets the appropriateness flag of an item page from "appropriate" to "inappropriate", such that the item page includes a process target item associated with a search keyword determined as an inappropriate keyword, (Step S501 in FIG. 14).

Thus, the process target item is not extracted as a search result of the item search using the inappropriate keyword.

[6-2. Second Example of Inappropriate Keyword Handling Process]

In a second example of the inappropriate keyword handling process, the inappropriate keyword handling process unit 2c deletes an inappropriate keyword from HTML data in the item page DB 100E (Step S601 in FIG. 15), such that the HTML data is for an item page including a process target item whose search keyword is determined as the inappropriate keyword. Thus, the association between an inappropriate keyword and a process target item is eliminated in the crawling operation of an item page at the time of updating the item page DB 100E. Accordingly, the process target item, for which the association is eliminated, is not be extracted as a search result in item search using the inappropriate keyword thereafter.

Further, the inappropriate keyword handling process unit 2c may replace the inappropriate keyword described in HTML data with another expression, instead of deleting the inappropriate keyword from HTML data. Specifically, the inappropriate keyword may be replaced with an expression such as "deleted". This achieves the above effect as well.

[6-3. Third Example of Inappropriate Keyword Handling Process]

In a third example of the inappropriate keyword handling process, the inappropriate keyword handling process unit 2c performs a process of lowering the priority (display priority) stored in the search DB 100E. Specifically, in the list of each item page associated with a search keyword, the inappropriate keyword handling process unit 2c lowers the priority information of an item page including a process target item whose search keyword is determined as the inappropriate keyword (Step S901 in FIG. 16). Accordingly, a process target item is not displayed in a higher rank of a search result of the item search using an inappropriate keyword.

[6-4. Fourth Example of Inappropriate Keyword Handling Process]

Figure 17:
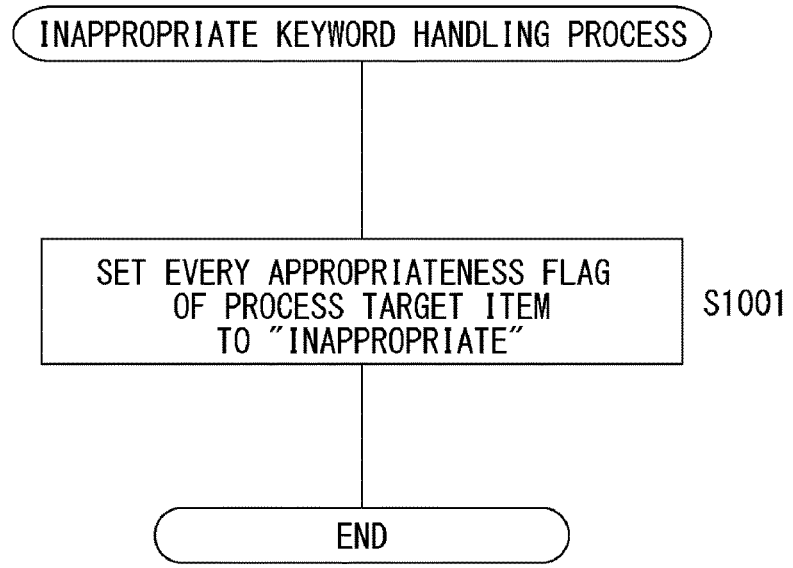
FIG. 17 is a flowchart showing fourth example of the inappropriate keyword handling process.

In a fourth example of inappropriate keyword handling process, the inappropriate keyword handling process unit 2c performs a non-display process of setting the appropriateness flag of a process target item from "appropriate" to "inappropriate", for every search keyword with which the process target item is associated in the search DB 100E (Step S1001 in FIG. 17). This process is, for example, performed for a malicious item page including various search keywords for the purpose of increasing the probability that the item is displayed as a search result. Accordingly, the process target item is not extracted as the search result of item search using any search keyword. In other words, the process target item is excluded from the search result of item search.

7. Modifications

In the description of above Step S105, the process target item extraction unit 2a determines whether or not an identical item is included in a plurality of search results. However, the process target item extraction unit 2a may determine whether or not an identical item is included in a predetermined number of search results. Specifically, the process is described with reference to FIG. 18. The processes identical to those described in FIG. 10 are referred to by the like numerals of FIG. 10, and are not described herein.

For example, when "3" is selected as the predetermined number, the process target item extraction unit 2a determines whether the obtained keyword set includes search keywords equal to or more than the predetermined number ("3") in Step S701 positioned between Steps S101 and S102.

If the obtained keyword set includes search keywords less than the predetermined number, the process target item extraction unit 2a determines whether or not to obtain another keyword set in the process of Step S110.

If the obtained keyword set includes equal to or more than the predetermined number of search keywords, the process target item extraction unit 2a performs a search keyword obtaining process of Step S102.

Figure 18:
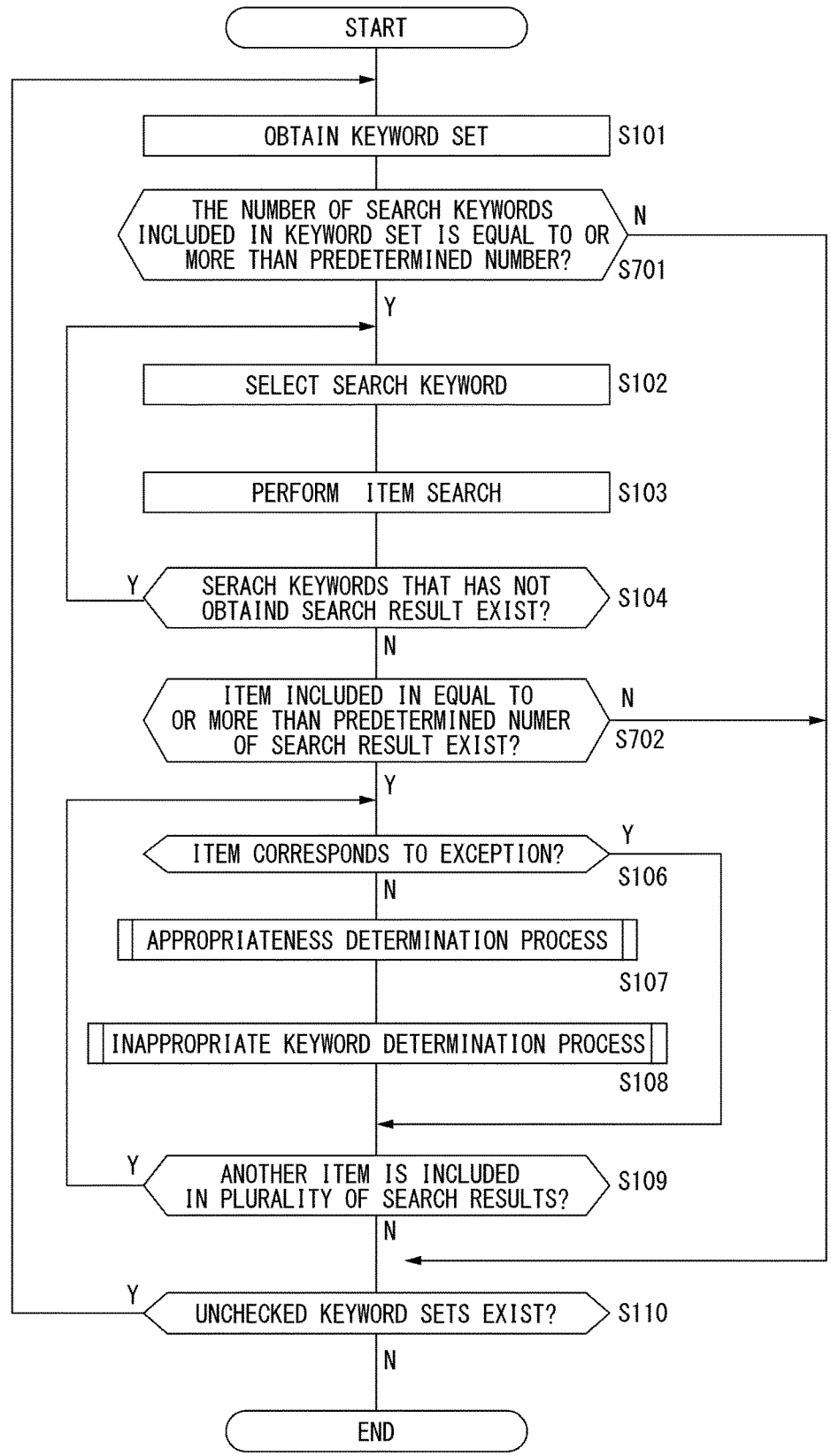
FIG. 18 is a flowchart showing another example of the process flow.

The process target item extraction unit 2a determines whether or not an item that corresponds to equal to or more than the predetermined number ("3") of search results exists in Step S702 in FIG. 18, instead of Step S105 in FIG. 10.

Accordingly, excessive determinations of an item as a process target item can be restricted.

In above Steps S103 to S105, when extracting an item included in a plurality of search results of item search as a process target item, the item search is performed one by one for each search keyword selected in Step S102. However, a Boolean search using an AND operator with a plurality of search keywords may be performed.

Figure 19:
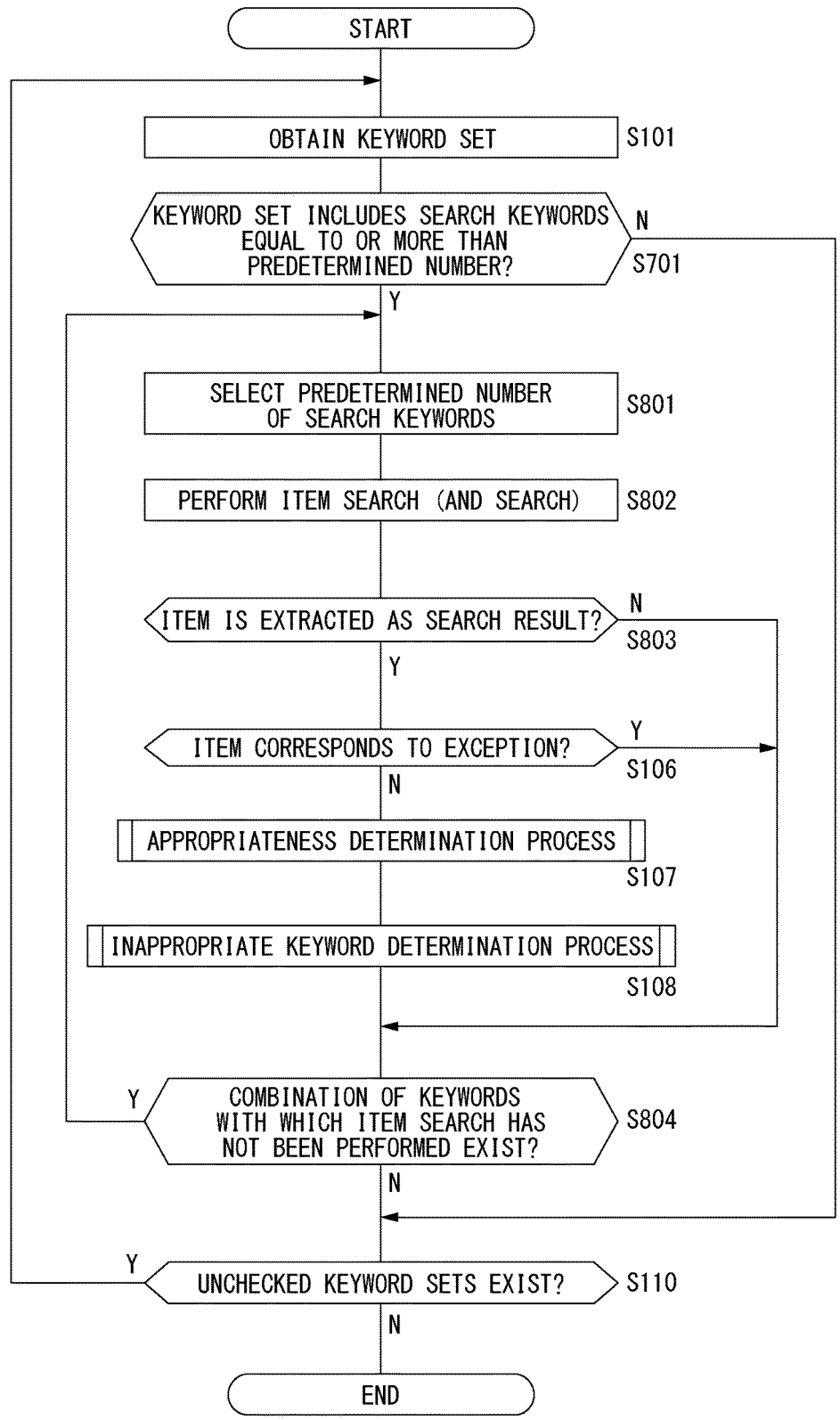
FIG. 19 is a flowchart showing yet another example of the process flow.

Specifically, the process is described with reference to FIG. 19. The processes identical to those described in FIG. 10 are referred to by the like numerals of FIG. 10, and are not described herein. The processes identical to those described in FIG. 18 are referred to by the like numerals of FIG. 18, and are not described herein as well.

After obtaining a keyword set in Step S101, the process target item extraction unit 2a determines whether the number of search keywords included in keyword set is equal to or more than the predetermined number in Step S701. When the search keywords are less than the predetermined number, the process target item extraction unit 2a determines whether or not to obtain another keyword set in the process of Step S110.

If the obtained keyword set includes equal to or more than the predetermined number of search keywords, the process target item extraction unit 2a subsequently selects one combination of a predetermined number of search keywords from the search keywords that belong to the keyword set, in Step S801. In following Step S802, the process target item extraction unit 2a performs item search using the predetermined number of search keywords selected in Step S801. The item search at this process is a Boolean search using an AND operator with which an item associated with all of the plurality of search keywords is extracted.

Next, the process target item extraction unit 2a determines whether or not an item extracted as a search result of the item search exists in Step S803. when no extracted item exists, the process target item extraction unit 2a, in Step S804, determines whether or not a combination of search keywords with which an item search (AND search) has not been performed exists among the combinations included in the keyword set obtained in Step S101. When a combination with which an item search has not been performed exists, the process target item extraction unit 2a performs the process of Step S801 again.

If a combination with which an item search has not been performed does not exist, the process target item extraction unit 2a determines whether or not an unchecked keyword set exists in Step S110.

In Step S803, when determining that an item extracted as a search result of AND search exists, the process target item extraction unit 2a performs Steps S106 to S108.

With the above process, for example, when an identical item is included in the searchitem results of two search keywords, determining that the item is a process target item, the process target item extraction unit 2a performs the AND search using two search keywords among the search keywords that belong to a keyword set and determines the item extracted in the search result as a process target item. When every possible combination of two search keywords is used in AND search, a process target item can be extracted exhaustively.

8. Summary

As described above, the item monitoring server 2 according to the present embodiment includes the process target item extraction unit 2a, the appropriateness determination unit 2b, and the inappropriate keyword handling process unit 2c. The process target item extraction unit 2a refers to the keyword database 200A storing keyword sets, each of the keyword sets being selected preliminarily as a combination of a plurality of search keywords that are contradictory, for example, and are unlikely to be jointly assigned to an identical item, performs item search targeting a database (the item DB 100C, the item page DB 100D, the search DB 100E, and a similar DB) storing item information, using each of the search keywords belonging to one of the keyword sets, and performs an extraction of a process target item. The appropriateness determination unit 2b performs a determination for the extracted process target item, the determination determining a search keyword that should not be assigned to the process target item as an inappropriate keyword, among respective search keywords of the keyword set used for the extraction of the process target item. The inappropriate keyword handling process unit 2c performs an inappropriate keyword handling process that improves a search result of item search using the search keyword determined as the inappropriate keyword.

Thus, an appropriate search result is extracted as a result of item search using the inappropriate keyword.

Accordingly, the accuracy and quality of item search can be improved.

The appropriateness determination unit 2b performs the determination whether or not a search keyword is an inappropriate keyword, using category information to which the process target item belongs.

Thus, the determination is performed, reflecting tendency of search keyword assignment in the item category to which the item belongs. For example, as described in the second example of the appropriateness determination process, a threshold value is lowered for an item category in which the number of items associated with a plurality of maker names is large. As a result, it is enabled that respective maker names are not determined as inappropriate search keywords.

The appropriateness determination unit 2b performs the determination whether or not a search keyword is an inappropriate keyword, using the number of appearances of the inappropriate keyword in an item page describing item information of the process target item.

A keyword that appears equal to or more than a predetermined number of times in an item page is described not for the purpose of increasing the probability of item search extraction in the item page, but is likely to be necessary for item presentation. Thus, by performing the above determination, a keyword appearing equal to or more than a predetermined number of times in an item page is determined as a necessary keyword and, and is not determined as an inappropriate search keyword.

Accordingly, the possibility that a keyword necessary for item presentation is determined as an inappropriate keyword is reduced.

The process target item extraction unit 2a performs the extraction of a process target item referring to the keyword DB 200A storing information of an item to be excluded from the process target item.

Thus, a condition of each item is reflected, and an item to be excluded from a process target item is prevented from being extracted as a process target item. For example, an item containing a variety of items, such as a lucky bag, is apparently likely to be associated with a variety of keywords. Accordingly, such item is preferably excluded from the process target item.

The above process in Step S106 excludes such item from the process target item, and thus a process target item can be appropriately extracted.

The inappropriate keyword handling process unit 2c performs an improvement process for description of the inappropriate keyword concerning an item page of the process target item, on a database that stores information of an item page, on databases (the item DB 100C, the item page DB 100D, the search DB 100E, and a similar DB) storing item page information, as the inappropriate keyword handling process.

Specifically, as described in the above second example of the inappropriate keyword handling unit, a process of deleting the inappropriate keyword from the HTML date of an item page, replacing the inappropriate keyword, or a similar process is performed.

Thus, a database that stores information of an item page information is improved.

Accordingly, a search result extracted by item search is improved.

As described in the above third example of the inappropriate keyword handling unit, the inappropriate keyword handling process unit 2c performs a process of lowering display priority of the process target item in the search result of item search, as the inappropriate keyword handling process.

Thus, display of the process target item in the search result of item search is improved.

Accordingly, the accuracy of item search is improved, and a user is less likely to view an item page including inappropriate description. Thus, the possibility that the user finds the quality of item search degraded is reduced.

As described in the above fourth example of the inappropriate keyword handling process, the inappropriate keyword handling process unit 2c performs a non-display process to exclude the process target item from display of the search result of item search as the inappropriate keyword handling process.

For example, the inappropriate keyword handling process unit 2c performs a process of setting an appropriateness flag of the process target item from "appropriate" to "inappropriate", for all the search keywords with which the process target item is associated.

Thus, the process target item is not displayed in the search result of item search.

Accordingly, a user is further less likely to view an item page including inappropriate description. Thus, the possibility that the user finds the quality of item search degraded is further reduced.

9. Program and Storage Medium

The item monitoring server 2 as an embodiment of an information processing device according to the present invention is as described above. A program according to the embodiment is a program for causing a processor (e.g., a CPU) to perform the processes in the item monitoring server 2.

A program according to the embodiment causes a processor to perform a process of referring to a database that stores keyword sets, with each of the keyword sets being selected preliminarily as a combination of a plurality of search keywords unlikely to be jointly assigned to an identical item.

The program also causes the processor to perform a process of performing item search targeting a database that stores item information using each of the search keywords belonging to one of the keyword sets, and to perform a process of performing an extraction of a process target item.

Further, the program causes the processor to perform a process of performing a determination for the extracted process target item, the determination determining a search keyword that should not be assigned to the process target item as an inappropriate keyword, among respective search keywords of the keyword set used for the extraction of the process target item.

In addition, the program causes the processor to perform an inappropriate keyword handling process that improves a search result of item search using the search keyword determined as the inappropriate keyword.

Figure 11:
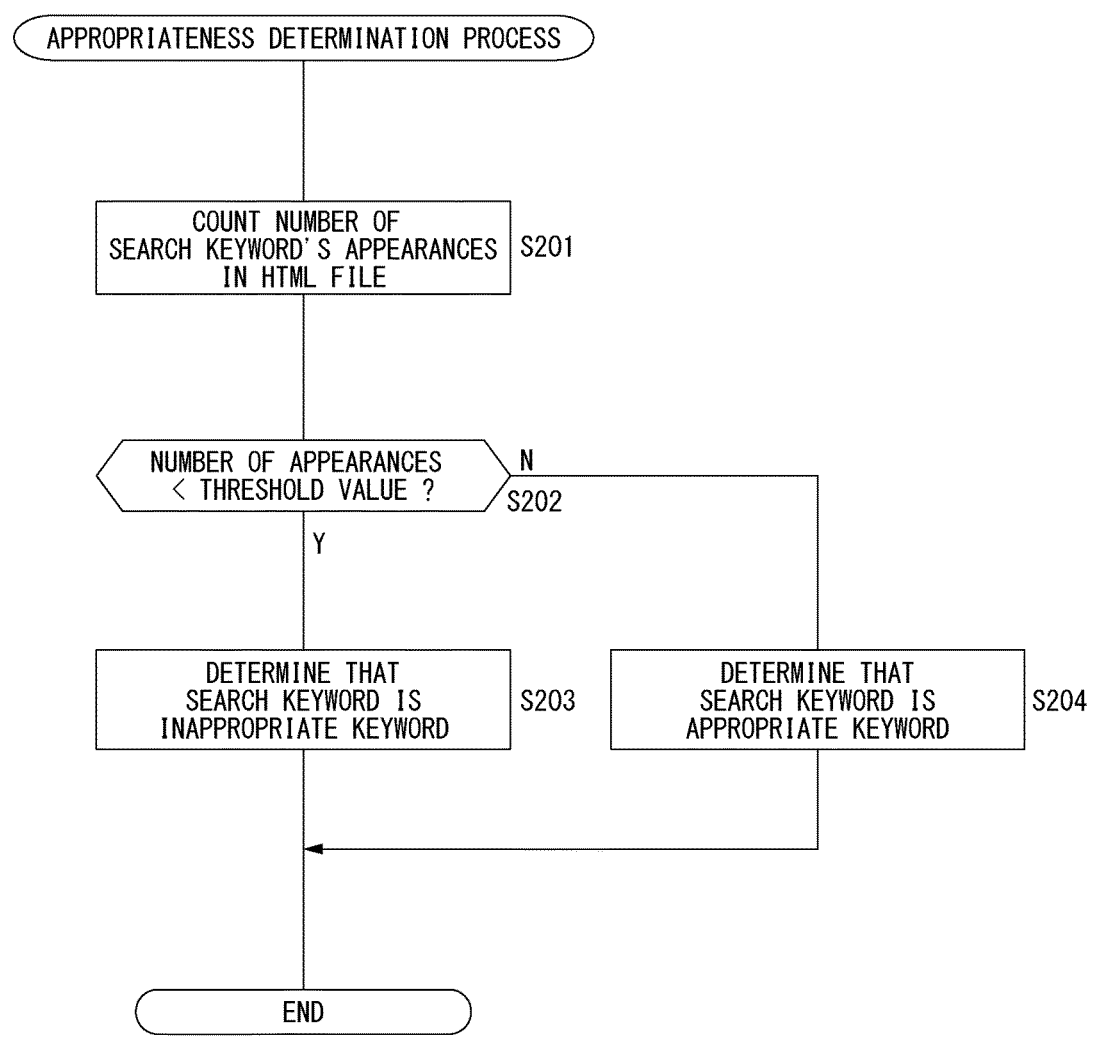
FIG. 11 is a flowchart showing first example of an appropriateness determination process.
Figure 13:
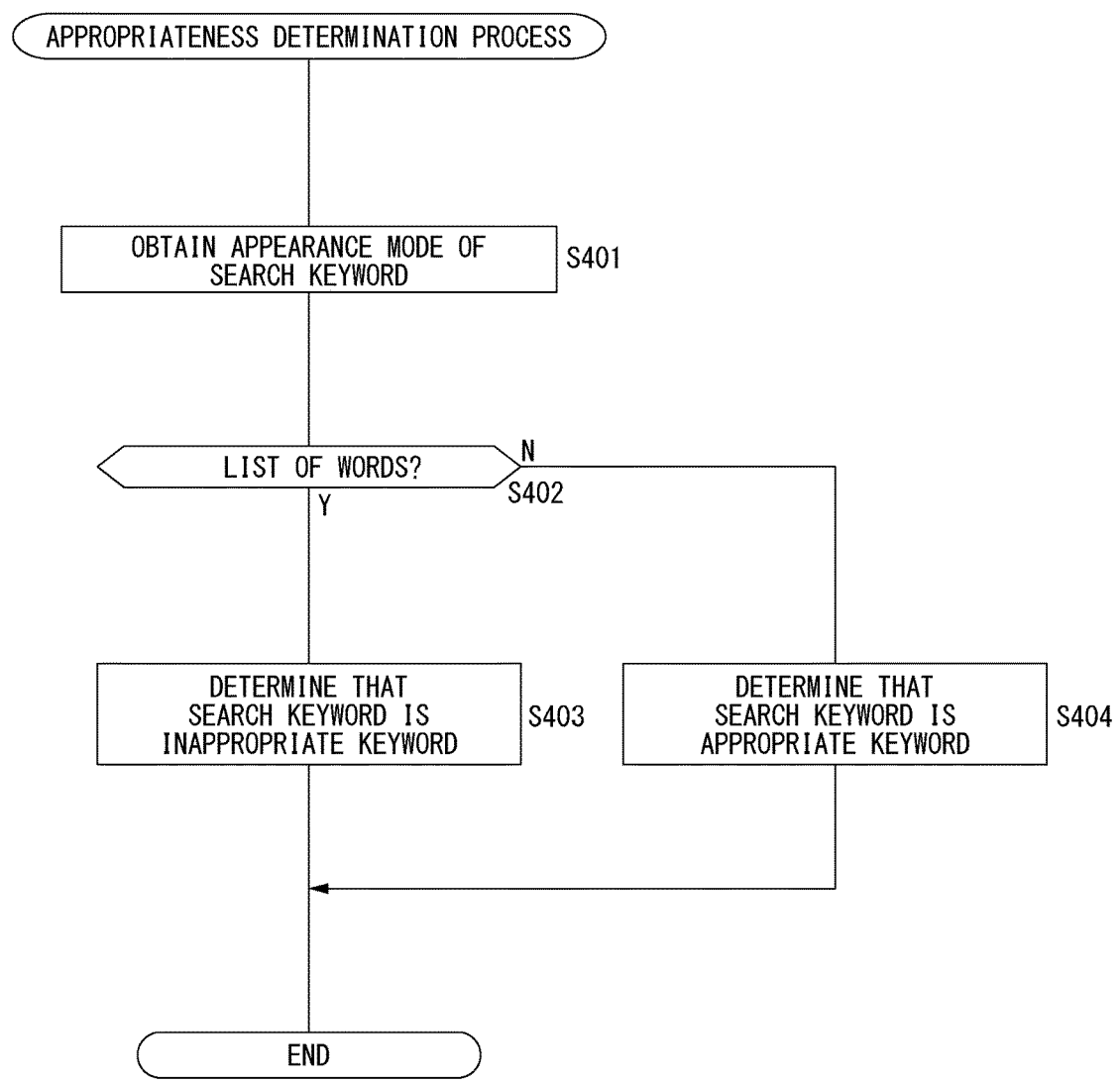
FIG. 13 is a flowchart showing third example of the appropriateness determination process.
Figure 14:
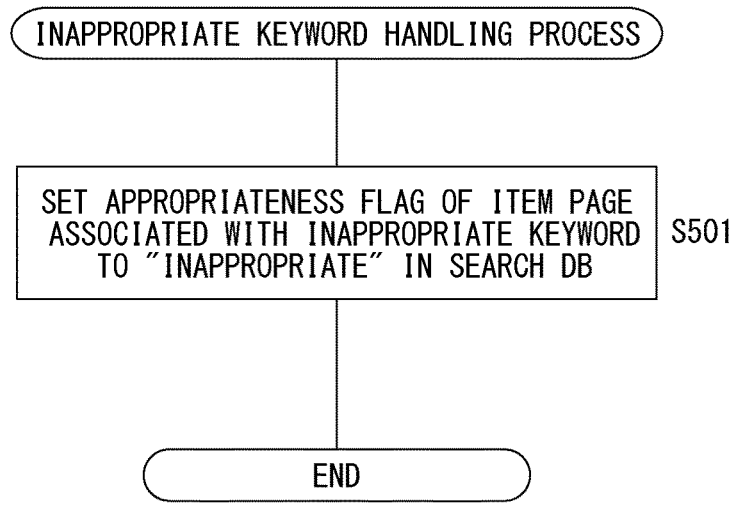
FIG. 14 is a flowchart showing first example of an inappropriate keyword handling process.
Figure 15:
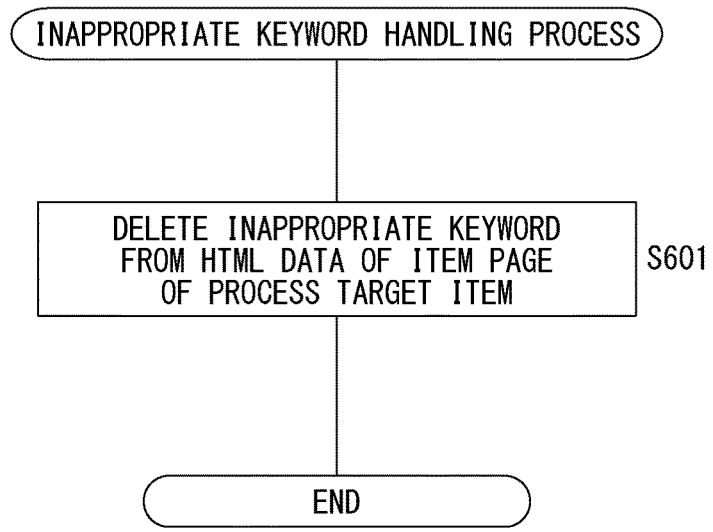
FIG. 15 is a flowchart showing second example of the inappropriate keyword handling process.
Figure 16:
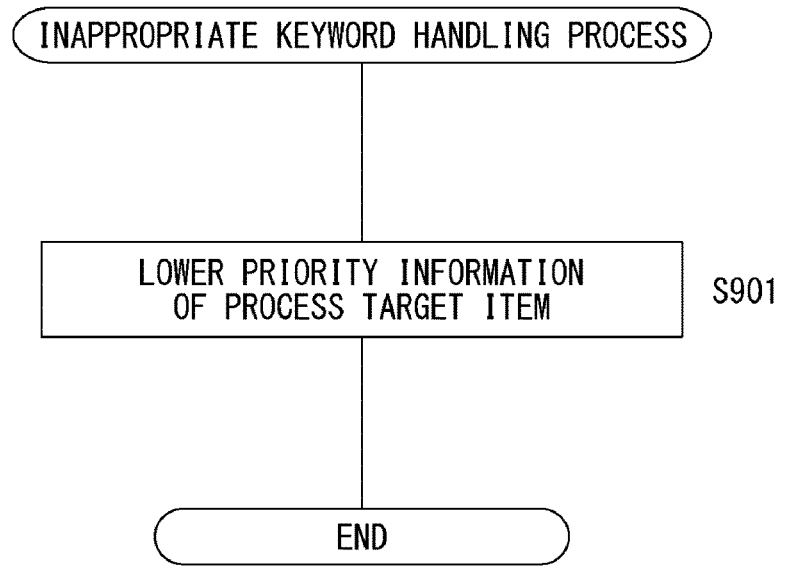
FIG. 16 is a flowchart showing third example of the inappropriate keyword handling process.

That is, this program is a program for causing a processor to perform the respective processes in Steps S101 to S110 described with reference to FIG. 10, the respective processes in Steps S201 to S204 described with reference to FIG. 11, the respective processes in Steps S301 to S303 described with reference to FIG. 12, the respective processes in Steps S401 to S404 described with reference to FIG. 13, the process in Step S501 described with reference to FIG. 14, the process in Step S601 described with reference to FIG. 15, the process in Step S901 described with reference to FIG. 16, the process in Step S1001 described with reference to FIG. 17, the respective Steps described with reference to FIG. 18, and respective Steps described with reference to FIG. 19.

This program can achieve the above-described item monitoring server 2.

The program as such can be pre-stored, for example, in a HDD as a storage medium built in a computer device or a similar device or in a ROM or the like in a microcomputer including a CPU. Alternatively, the program can be temporarily or permanently stored (recorded) in a removable storage medium, such as a semiconductor memory, a memory card, an optical disk, a magneto-optical disk, or a magnetic disk. Such a removable storage medium can be provided as what is called package software.

The program can not only be installed from the removable storage medium, for example, to a personal computer, but also be downloaded from a download site over a network, such as a LAN and the Internet.

REFERENCE SIGNS LIST 1 electronic commerce server, 2 item monitoring server, 2a process target item extraction unit, 2b appropriateness determination unit, 2c inappropriate keyword handling process unit, 2d update process unit, 3 communication network, 4 item provider terminal, 5 user terminal, 100A user DB, 100B item provider DB, 100C item DB, 100D item page DB, 100E search DB, 200A keyword DB

What is claimed is:

1. An information processing device comprising:
at least one memory configured to store computer program code;
at least one processor configured to access the computer program code and operate as instructed by the computer program code, the computer program code including:
process target item extraction code configured to cause at least one of the at least one processor to access a database that stores keyword sets, each of the keyword sets being selected preliminarily as a combination of a plurality of search keywords unlikely to be jointly assigned to an identical item, to perform an item search targeting a database that stores item information using each of the search keywords belonging to one of the keyword sets, to perform an extraction of a process target item, and to determine whether a number of search keywords included in the keyword set is greater than or equal to a predetermined number;
appropriateness determination code configured to cause at least one of the at least one processor to perform a determination for the extracted process target item, the determination determining a search keyword that is not to be assigned to the process target item, as an inappropriate keyword, among respective search keywords of the keyword set used for the extraction of the process target item;
inappropriate keyword handling process code configured to cause at least one of the at least one processor to perform an inappropriate keyword handling process that updates a search result of the item search excluding the search keyword determined as the inappropriate keyword, and lower a display priority of the process target item in the search result when the search keyword is determined as the inappropriate keyword; and
display code configured to cause at least one of the at least one processor to control a display to display the search result.

2. The information processing device according to claim 1, wherein
the appropriateness determination code is further configured to cause at least one of the at least one processor to perform the determination, using category information to which the process target item belongs.

3. The information processing device according to claim 1, wherein
the appropriateness determination code is further configured to cause at least one of the at least one processor to perform the determination, using the number of appearances of the inappropriate keyword in an item page describing item information of the process target item.

4. The information processing device according to claim 1, wherein
the process target item extraction code is further configured to cause at least one of the at least one processor to perform the extraction accessing a database that stores information of an item to be excluded from the process target item.

5. The information processing device according to claim 1, wherein
the inappropriate keyword handling process code is further configured to cause at least one of the at least one processor to perform an improvement process for description of the inappropriate keyword concerning an item page of the process target item, on a database that stores information of the item page, as the inappropriate keyword handling process.

6. The information processing device according to claim 1, wherein
the inappropriate keyword handling process code is further configured to cause at least one of the at least one processor to perform a non-display process to exclude the process target item from a display of the search result of the item search as the inappropriate keyword handling process.

7. An information processing method performed by a processor of an information processing device, the method comprising:
accessing a database that stores keyword sets, each of the keyword sets being selected preliminarily as a combination of a plurality of search keywords unlikely to be jointly assigned to an identical item;
performing an item search targeting a database that stores item information using each of the search keywords belonging to one of the keyword sets;
performing an extraction of a process target item and determine whether a number of search keywords included in the keyword set is greater than or equal to a predetermined number;
determining a search keyword that is not to be assigned to the process target item, as an inappropriate keyword, among respective search keywords of the keyword set used for the extraction of the process target item;
performing an inappropriate keyword handling process that updates a search result of the item search excluding the search keyword determined as the inappropriate keyword and lowering a display priority of the process target item in the search result when the search keyword is determined as the inappropriate keyword; and
displaying the search result.

8. A non-transitory storage medium storing a program for causing a processor to:
access a database that stores keyword sets, each of the keyword sets being selected preliminarily as a combination of a plurality of search keywords unlikely to be jointly assigned to an identical item,
perform an item search targeting a database that stores item information, using each of the search keywords belonging to one of the keyword sets,
perform an extraction of a process target item and determine whether a number of search keywords included in the keyword set is greater than or equal to a predetermined number;
determine that a search keyword that is not to be assigned to the process target item, as an inappropriate keyword, among respective search keywords of the keyword set used for the extraction of the process target item;
perform an inappropriate keyword handling process that updates a search result of the item search excluding the search keyword determined as the inappropriate keyword, and lowering a display priority of the press target item in the search result when the search keyword is determined as the inappropriate keyword; and
display the search result.

9. The information processing device according to claim 1, wherein the process target item extraction code is further configured to cause at least one of the at least one processor to, based on determining that the number of search keywords included in the keyword set is less than the predetermined number, determine whether to obtain another keyword set.

* * * * *